Patented Apr. 5, 1938

2,112,987

UNITED STATES PATENT OFFICE 2,112,987

SOLUBLE HALOGEN CONTAINING BUTADIENE DERIVATIVES

Erich Gebauer-Fuelnegg, deceased, late of Evanston, Ill., by Marie Gebauer-Fuelnegg, administratrix, Evanston, Ill., and Eugene W. Moffett, Chicago, Ill., assignors to Marbon Corporation, a corporation of Delaware No Drawing. Application July 9, 1935, Serial No. 30,515

14 Claims. (Cl. 260—1)

This application is a continuation in part of our copending application, Serial No. 708,429, filed January 26, 1934, which in turn contains matter derived from our copending application therewith, Serial No. 703,866, filed December 23, 1933, which has matured into Patent No. 1,980,396.

The present invention relates to soluble types of polymerized butadiene hydrohalides and their derivatives, and more particularly to amorphous asymmetrical rubber hydrohalides. It includes compositions containing them and products made from them. Among the products are coating compositions, coated objects and sheets or films.

Butadiene derivatives such as rubber are unsaturated hydrocarbons and as such are capable of reacting additively with various substances which attach themselves at the double bonds of the molecule. Rubber, for example, is generally considered as a straight chain hydrocarbon, having the empirical formula $(C_5H_8)_x$ and the nuclear formula:

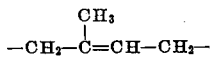

When rubber is saturated with hydrogen chloride the empirical formula is changed from $(C_5H_8)_x$ to $(C_5H_9Cl)_x$. It has been found that when hydrogen halides, as for example hydrogen chloride, are introduced into a rubber solution at ordinary temperature a crystalline symmetrical rubber hydrochloride is produced containing on substantial completion of the reaction about 31-32% chlorine, and having a crystalline X-ray pattern. Such compounds, and as far as is known, all compounds made with hydrogen chloride and rubber at ordinary temperatures are relatively insoluble in common rubber solvents. Benzol, toluene, ethylene dichloride, carbon tetrachloride and similar solvents in the cold will dissolve less than 1% of such rubber hydrochloride, and even on heating to 60° C. only about 7% solutions can be obtained which jell on standing at room temperature after only a short period of time. It is believed that all such rubber hydrochloride compounds are crystalline, and may be represented by the following nuclear formula:

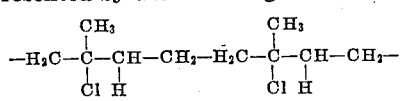

It is an object of this invention to produce a soluble type of hydrohalogenated rubber.

Another object is to produce an asymmetrical halogen containing rubber derivative.

A further object is to produce a thin, flexible, amorphous sheet or film containing rubber hydrochloride, suitable for wrapping paper, photographic film base, or the like.

Another object of this invention is to produce a coating composition suitable for use in coating and impregnating wood, metal, fabric, paper and the like.

Another object is to produce non-jelling solutions of hydrohalogenated rubber.

A further object is to produce solutions of hydrohalogenated rubber suitable for coating and casting without the necessity of heat to obtain usable solutions.

Another object is the production of stable solutions which may be shipped and stored for extended periods of time without gel formation.

Other objects will become apparent on reading the specification.

In the present invention a hydrogen halide is reacted with a polymerized butadiene derivative at low temperatures of below about —35° C., the exact temperature depending somewhat on the type of butadiene body, on the time of exposure of the butadiene to the low temperature, on the concentration of the hydrogen halide, on the type of hydrogen halide and on the degree of solubility desired; but in the case of rubber and hydrogen chloride the temperature range for practical purposes for producing the soluble type product is from about —35° C. to the freezing point of the hydrogen chloride.

The product obtained from the reaction is mixed with a solvent such as benzol, toluene, chloroform, carbon tetrachloride, ethylene dichloride and the like. Solutions of a concentration of 7% are readily obtained in the cold which are stable over extended periods of time, and which may be used for casting or coating purposes.

The following examples in which rubber is used will illustrate the treatment of a polymerized butadiene derivative. It is to be understood that the resistance of the material to turpentine is but a standard of comparison to indicate in general the comparative resistance of the materials to solvents and many oils. The turpentine test, although valuable as an indication of relative solubility and relative oil resistance, is an extreme test and failure under it does not indicate, in general, any fatal defect commercially.

Example I

Pale crepe rubber in sheets of about .02" thickness are exposed to liquefied hydrogen chloride at a temperature of approximately —85° C. for three minutes. The rubber is substantially completely reacted. A product is obtained having a chlorine content of about 29.5% and which is readily soluble in the cold to give 7% solution in benzol, toluene, carbon tetrachloride and ethylene dichloride. The product is also readily softened by turpentine and many oils. On X-ray analysis it shows a typical amorphous ring image indicating a non-crystalline compound. Films made from it are penetrated by turpentine in 5 minutes.

Example II

Sheets of rubber of about .02" thickness are placed in contact with liquefied hydrogen chloride at —50° C. under equilibrium pressure for about 15 minutes. A product is obtained having a chlorine content of 30.4%. Films made from this material of about .001" thickness allow turpentine to penetrate through them in about 9 minutes.

Example III

Sheets of rubber of about .02" thickness are placed in contact with liquefied hydrogen chloride at about —35° C. under equilibrium pressure for about fifteen minutes. The rubber is substantially completely reacted. A product is obtained having about 31.3% chlorine. Turpentine penetrates through films made therefrom only after about two hours. On shorter time of exposure to the liquefied hydrogen chloride the reaction product is slightly more resistant to turpentine.

Example IV

Sheets of rubber of about .02" thickness are placed in contact with liquefied hydrogen chloride at —20° C., 0° C. and room temperature, under the respective pressures corresponding to the temperatures at equilibrium conditions. The products obtained have chlorine contents from about 31% at —20° C. to 32.3% at room temperature, and all are not affected by turpentine.

Example V

Sheets of rubber of about .02" thickness are exposed to gaseous hydrogen chloride at —85° C. and atmospheric pressure for about 20 hours. Films made from the resulting product are penetrated by turpentine.

Example VI

Sheets of rubber of about .02" thickness are exposed to gaseous hydrogen chloride at about 70 pounds per square inch pressure (equilibrium pressures) for 45 minutes at a temperature of —50° C. A product is obtained having a chlorine content of 25.4%. Films made from this material are slightly softened by turpentine. After 1½ hours of exposure the chlorine content is about 31.1% and remains about the same after 4½ hours' exposure. The resistance to turpentine is about the same. Products made at —35° C. are definitely more resistant to turpentine than those made at —50° C. At —20° C., 0° C. and room temperature turpentine has no noticeable effect.

Example VII

Sheets of rubber of approximately .02" thickness are exposed to gaseous hydrogen chloride at —20° C. under approximately equilibrium pressure. The following results are obtained:

| Time | Chlorine content | Turpentine resistance |
|---|---|---|
| 45 min | 23.9 | No effect. |
| 1½ hours | 32.9 | Do. |
| 4½ hours | 33.6 | Do. |

Example VIII

Sheets of rubber of approximately .02" thickness are exposed to gaseous hydrogen chloride at 0° C., and room temperature. The results are similar to Example VI.

In the production of the soluble type of hydrohalogenated rubber the most important point is to carry out the reaction at a temperature sufficiently low to produce the soluble type of product. Partially or completely reacted products may be obtained by varying the time of contact. The time for completion of the reaction is apparently about entirely dependent on the thickness or state of division of the rubber, and on the concentration of the hydrogen chloride. For thick rubber and low concentration the time should be increased. Granular rubber may be used; also scrap rubber, reclaimed rubber and partially vulcanized rubber is operable.

The exact mechanism of what takes place when rubber is reacted with hydrogen chloride at low temperatures is not definitely known; possibly some change takes place in the rubber at the low temperature resulting in the product obtained from the rubber being different. The maximum chlorine content of the hydrochlorinated rubber produced at —85° C. is about 29.9%, and apparently the maximum chlorine content increases slightly with increase in temperature. The evidence obtained from chemical and X-ray analysis indicates that the soluble product obtained at low temperatures of viz. —85° C. is an amorphous compound composed essentially of asymmetrical rubber hydrochloride which in the light of present day knowledge is believed to have the following nuclear formula:

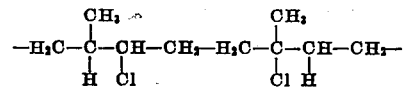

It is believed that the resistance of the hydrohalogenated rubber to solvents increases with increase in temperature, and although there probably is no sharp line of temperature demarcation for the solvent resistant and soluble type of product the turning point for practical purposes is about —35° C. for rubber and hydrogen chloride, with possibly a slight variation above or below that temperature depending on the time of exposure of the rubber at that temperature and the concentration of the hydrogen chloride. At —85° C. the product obtained from liquefied hydrogen chloride and rubber is definitely amorphous and as near as can be determined is almost entirely asymmetrical rubber hydrochloride. As the temperature at which the reaction is carried out is increased it is believed that some of the symmetrical compound is formed, accounting for the increased resistance of the resulting product to solvents and oils, and that at room temperature and probably even as low as —20° C. the product is totally or at least predominantly symmetrical, as at such elevated temperature the material is very resistant to solvents and softeners such as turpentine.

The asymmetrical amorphous compound produced at low temperature is softened by small amounts of plasticizers such as chlorinated paraffin, diphenyl ether, butyl stearate, amyl benzene and the like. It is particularly suitable for the production of films, either coated films or self-sustaining films. In our copending applications, Serial No. 722,252 and Serial No. 722,510, we disclose the coating of rubber hydrochloride on sheet material including paper, and in our application, Serial No. 708,429, we describe the production of self-sustaining thin sheets or films from rubber hydrochloride. The solutions of the present invention are particularly suitable for use in making flexible transparent films, suitable for wrapping purposes, photographic film base, and moisture proof coatings.

The following will illustrate the use of the soluble type of rubber hydrochloride as applied to the production of transparent, flexible sheet or film:

The excess hydrogen chloride remaining in the sheet after the reaction is complete is first removed by suitable means such as a vacuum or increased temperature, or a combination of the two.

The first step in the present process for producing sheet material comprises the dissolving of the rubber hydrochloride, prepared in accordance with the above described process, in an organic solvent. For this purpose a large number of solvents are usable, such as carbon tetrachloride, benzene and its homologues, or ethylene dichloride. Of these, benzene is to be preferred because at the present time it is cheaper than any of the others. However, such materials as carbon tetrachloride and ethylene dichloride have the great advantage that they are non-inflammable, or burn with difficulty and thereby reduce the fire hazard.

From 3 to 10% of the soluble type rubber hydrochloride may be dissolved in one of the above solvents, although a range of from 4 to 8% will be found to be preferable, and may be obtained without the aid of heat.

While it is possible to produce a thin, transparent sheet from a solution as described above, containing rubber hydrochloride alone, it is preferable to add certain other materials which act as plasticizer or fillers or aging resisters. A large variety of inert materials and high boiling solvents may be employed in this manner. Any such material which is compatible with rubber hydrochloride in solution and which is non-blooming may be employed. Among others, are the following:

Butyl stearate
Chlorinated paraffin
Paraffin
Rosin
Arochlors (chlorinated diphenyls)
Chlorinated diphenyl ethers
Anti-oxidants
Rubber accelerators These materials act as plasticizers and fillers and improve the quality of the finished sheet material. When the above substances are liquids and tend to make the sheet tacky, they should be used only in amounts between 1½ and 3%, based upon the weight of rubber hydrochloride in the solution. However, where they do not produce a tacky sheet, they may be used in amounts up to 5% or even more. For example, the hard or highly chlorinated arochlors may be used in amounts up to 15 or 20%.

The soluble or asymmetrical type of rubber hydrochloride being more affected by solvents and plasticizers than other rubber hydrochlorides may be plasticized with only small amounts of materials. Chlorinated paraffin, butyl stearate, amyl benzene and other materials give flexible sheets when used in 1½–3% proportion, but must be used in considerably larger amounts with other types of rubber hydrochloride to get the same degree of flexibility.

Antioxidants may be added, if desired, to produce a sheet which will maintain its pliability and flexibility over a longer period of time. The anti-oxidants used for this purpose may be those commonly used in rubber products, such as phenyl beta naphthalamine, diphenyl amine, o and p ditolylamines, although when a clear sheet is desired, care should be taken to employ only such anti-oxidants as will not become colored on oxidation. If rubber accelerators are used, it should be remembered that they often have anti-oxidant properties, in which case anti-oxidants may be unnecessary. An example of such a material is hexamethylene tetramine.

The coating solution made up in accord with the above disclosure may be formed into sheets by means of the machine disclosed in Reissue Patent No. 17,854, issued to Edouard M. Kratz. In the operation of this machine, the solution described above is spread upon a continuous forming belt as a thin film and is dried thereon, after which it is removed and wound into rolls of convenient size.

For best results, the temperature of drying should not be allowed to exceed 90° C., and is preferably maintained between 60 and 80° C. When the drying is done at a very high temperature there is a tendency for the rubber hydrochloride to decompose.

The product of our invention is a self-sustaining sheet material, having by itself excellent resistance to the penetration of moisture vapor. When prepared in thin, transparent sheets of around .001" thickness, because of its flexibility and pliability together with its stability toward extremes of atmospheric conditions of temperature and humidity, our product is peculiarly adapted for general wrapping purposes.

The sheets produced from rubber hydrochloride made at low temperatures of, for example, −85° C. are more inherently flexible than films made with other rubber hydrochloride, and remain in their flexible condition longer than the other rubber hydrochlorides. This may be due to the fact that the new rubber hydrochloride is amorphous instead of crystalline. The films may be plasticized with small amounts of plasticizers so that a large amount of liquid need not be incorporated to obtain flexibility with consequent decrease in tensile strength.

It is to be understood that the invention is not limited to the specific details of the examples but includes broadly the reaction of polymerized butadiene derivatives such as rubber at low temperatures with hydrogen halides, and the production of a soluble type of hydrohalogenated polymerized butadiene derivative.

It is to be understood also that the reaction of hydrogen halides at a low temperature with solid or undissolved butadiene bodies is a general one, and the production of asymmetrical compounds by such means is a general phenomenon. Butadiene derivatives include compounds such as synthetic rubber, methyl rubber, balata, gutta percha and the like, and may be considered as compound having the nuclear formula

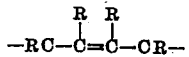

where R is an aryl, alkyl, hydrogen or halogen radical.

Asymmetrical butadiene hydrohalides in general may be considered in the light of present day knowledge of rubber chemistry and of this invention to have the nuclear formula:

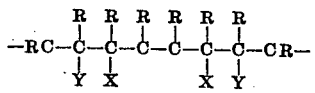

Where R is an aryl, alkyl, halogen or hydrogen radical, Y is an alkyl, aryl or hydrogen radical and X is a halogen radical. By various reactions, such as with cyanides, or by hydrolysis X or Y may be substituted with other radicals such as CN, OH, S and the like, with the formation of entirely new compounds. The asymmetrical rubber hydrochloride may, for example, be reacted with sulfur chloride as described in our copending application, Serial No. 703,865, with the production of a new vulcanized rubber hydrochloride.

By the term "soluble type rubber hydrochloride" is meant the rubber hydrochloride which is soluble in benzol at 20° C. to greater than 2% as distinguished from the "solvent resistant type rubber hydrochloride" which is insoluble to less than 1% in cold benzol and if dissolved with heating to give a solution of 6–8% forms a gel on cooling.

What is claimed is:

1. As a new product, amorphous rubber hydrochloride, characterized by its stability against change into a crystalline state.
2. A composition of matter comprising the reaction product of undissolved rubber and hydrogen chloride at a temperature substantially below —35° and sufficiently low to produce a relatively soluble product.
3. A composition suitable for coating, impregnating or casting purposes, comprising a solution of an amorphous soluble type rubber hydrochloride in a volatile solvent.
4. A composition of matter comprising the evaporation residuum of a solution of amorphous, soluble type rubber hydrochloride and a volatile solvent.
5. As a new article of manufacture, a thin flexible sheet comprising an amorphous soluble type rubber hydrochloride.
6. As a new article of manufacture, a thin, flexible sheet composed essentially of the reaction product of rubber and hydrogen chloride obtained at a temperature substantially below —35° C.
7. The method of producing a hydrohalogenated butadiene derivative which comprises exposing an undissolved butadiene polymer to the action of a hydrogen halide at a temperature substantially below —35° C. and sufficiently low and for a sufficient length of time to obtain a hydrohalogenated body which is more soluble than hydrohalogenated bodies produced at above —35° C.
8. The method of producing hydrochlorinated rubber which comprises subjecting undissolved rubber to the action of hydrogen chloride at temperatures substantially below —35° C.
9. The method of producing a hydrochlorinated rubber which comprises subjecting undissolved rubber to the action of liquefied hydrogen chloride at a temperature substantially below —35° C.
10. The method of producing a hydrochlorinated rubber which comprises subjecting undissolved rubber to the action of gaseous hydrogen chloride at a temperature substantially below —35° C.
11. As a new product, an amorphous substantially saturated addition product of rubber and hydrogen chloride, characterized by its ability to dissolve in benzol at 20° C. with the formation of non-jelling sols in concentration of 3%.
12. A compound of rubber and hydrogen chloride obtained by reacting solid rubber with liquid hydrogen chloride at a temperature of approximately —85° C.
13. A coating composition comprising amorphous rubber hydrochloride and a resin dispersed in a volatile solvent.
14. Rubber hydrochloride which is substantially saturated to hydrogen chloride, and of approximately 30% chlorine content, characterized in that .001 inch thick films made thereof are penetrated by turpentine in about nine minutes or less.

MARIE GEBAUER-FUELNEGG,
Administratrix of the Estate of Erich Gebauer-Fuelnegg, Deceased.
EUGENE W. MOFFETT.